Oct. 1, 1935.     W. K. FLEMING ET AL     2,015,667
RADIO INTERFERENCE ELIMINATOR
Filed Nov. 23, 1931
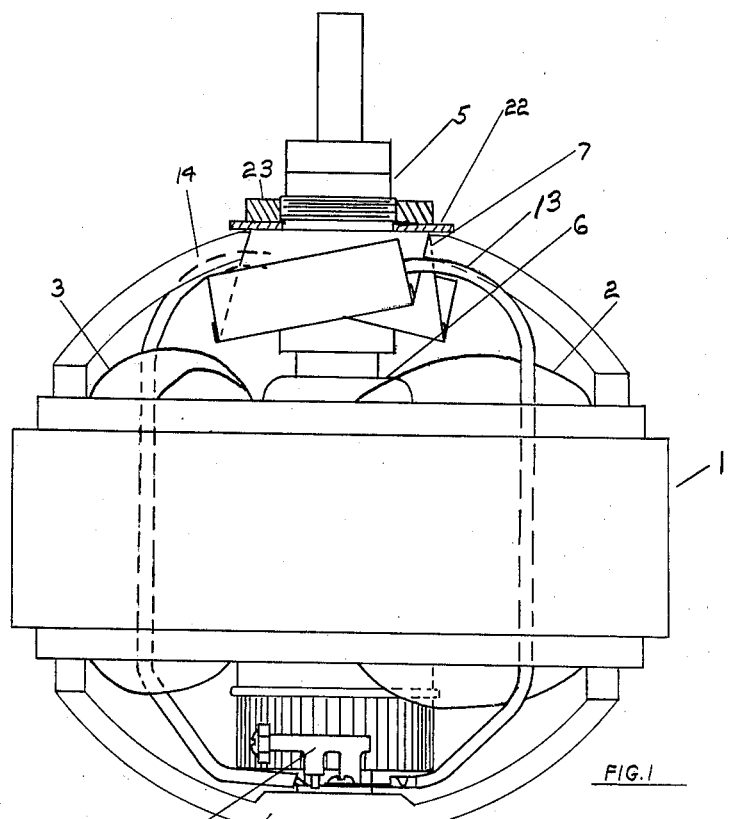
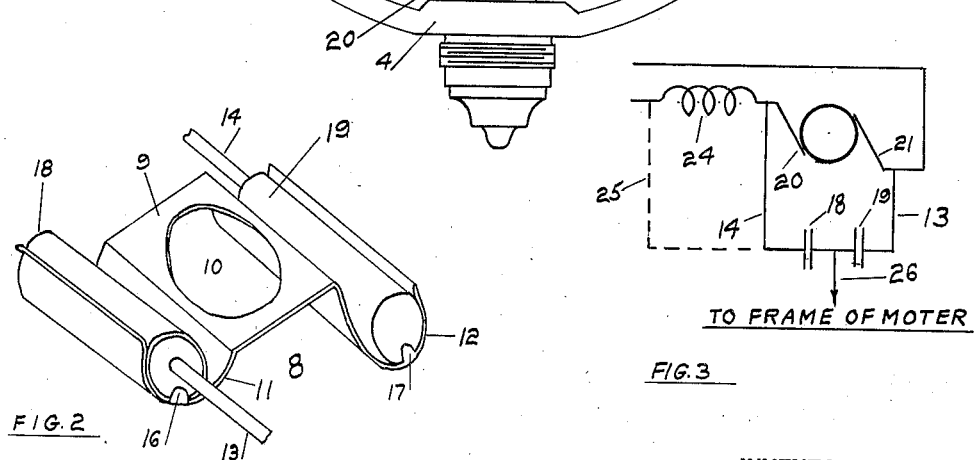
INVENTOR
Wilfred K. Fleming
BY Rupert L. Haskins
Ezekiel Wolf
ATTORNEY Patented Oct. 1, 1935

2,015,667

UNITED STATES PATENT OFFICE 2,015,667

RADIO INTERFERENCE ELIMINATOR

Wilfred K. Fleming, Canton, and Rupert L. Haskins, Boston, Mass.

Application November 23, 1931, Serial No. 576,652

2 Claims. (Cl. 172—36)

The present invention relates to means and methods of applying interference eliminating means to machines which cause interference with radio broadcast reception and other radio reception. The invention relates more in particular to the application to the elimination of such interference as caused by motors or generators which may have brushes or which may have contact making or breaking devices.

In such machines interference may be very objectionable as it may continue incessantly for some time. The invention described in the present application shows the application of the principle here involved to a number of modifications in particular to a dentist drilling motor and to an ordinary hand drill. One of the chief difficulties in applying interference eliminating means to such machines is that there is little space in which such means can be placed and if the means are not placed near the machine, their useful effect might be lost.

In the present invention the means are placed within the motor frame or in such close proximity to it that the leads are only a few inches long. The invention will be more clearly understood from an examination of the drawing in connection with the description showing various embodiments of the invention. In the drawing, Figure 1 shows a view of a dental drill motor with the cover removed; Figure 2 shows the unit for eliminating interference; and Figure 3 illustrates the circuit.

In Figure 1 which represents a motor of the usual construction, there is provided a frame which carries the coils 2, 3, etc., for energizing the magnetic poles and the bearings 4 and 5 in which the rotor element 6 of the motor rotates. The bearing 5 sets in a supporting collar 7, forming a part of the frame. It is over this collar on the opposite end of the motor from the brush end that the interference elemination unit 8 is placed. The unit comprises a flat piece 9 of metal or other suitable material which has a hole 10 therein in which the bearing 5 fits. The metallic plate 9 covers the surface of the collar 7 and is bent downward on both sides thereof into curved supporting elements 11 and 12, which may be called condenser supporting clips. It will be noted from Figure 1 that one supporting clip or arm is at an angle with the other, namely that they are not parallel and that the connecting lead 13 comes out upward from one end and the other upward from the other end. This together with the little tabs 16 and 17 at both ends of the condenser clips 11 and 12 help to keep the condensers 18 and 19 firmly in place. The condensers 18 and 19 snap or are pressed in the holding elements in any suitable or secure manner. The lead 14 as shown in Figure 1 connects to one brush element 20, while the other lead 13 connects to the other brush element 21 not shown in Figure 1.

The element supporting the condensers 18 and 19 is somewhat the shape of a saddle and is in fact saddled over the bearing 5 and collar 7. It remains in place and practically without any support, but I prefer to have the case 22 shown in fragment in section in Figure 1 fit snugly over it and to have a nut 23 threading on the bearing 5 for further support.

In Figure 3 is shown diagrammatically the circuit used in Figure 1. The condensers 18 and 19 are connected in series across the rotor by the leads 13 and 14. In place of connecting across the rotor the lead 14 may be connected to have the rotor and field 24 in series as shown by the dotted line 25 in Figure 3. The center tap 26 between condensers 18 and 19 is connected to the frame of the motor so that the frame itself is at the mid-potential at all times. This may be accomplished as indicated in Figure 1 by connecting the condenser terminals other than 13 and 14 together and grounding them to the saddle support 8.

Having now described our invention, we claim:

1. In combination with a drill motor having a frame and a bearing supported in said frame, a saddle means adapted to fit over the bearing support and provided with carrier elements extending inwardly of said frame, electrical interference eliminating elements supported in said carrier elements, and means connecting said elements with the motor elements.

2. In combination with a drill motor having a frame and a bearing supported in said frame, a saddle means adapted to fit over the bearing support and bent to form curved supporting elements positioned within the frame, condensers supported within said supporting elements and having connections connecting to the brushes of said motor.

WILFRED K. FLEMING.
RUPERT L. HASKINS.